(12) United States Patent
Yeh

(10) Patent No.: US 8,589,619 B2
(45) Date of Patent: Nov. 19, 2013

(54) DATA WRITING METHOD, MEMORY CONTROLLER, AND MEMORY STORAGE APPARATUS

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 243 days.

(21) Appl. No.: 13/012,808

(22) Filed: Jan. 25, 2011

(65) Prior Publication Data

US 2012/0110243 A1    May 3, 2012

(30) Foreign Application Priority Data

Oct. 29, 2010  (TW) ................................ 99137281 A

(51) Int. Cl.
G06F 12/00 (2006.01)
G06F 13/00 (2006.01)
G06F 13/28 (2006.01)

(52) U.S. Cl.
USPC ............................. 711/103; 711/156; 711/170

(58) Field of Classification Search
USPC .................................. 711/103, 154, 156, 170
See application file for complete search history.

(56) References Cited

U.S. PATENT DOCUMENTS

| | | | | |
|---|---|---|---|---|
| 8,489,855 | B2 * | 7/2013 | Schuette | 711/209 |
| 2003/0070036 | A1 * | 4/2003 | Gorobets | 711/103 |
| 2010/0208504 | A1 * | 8/2010 | Kim et al. | 365/80 |
| 2012/0059978 | A1 * | 3/2012 | Rosenband et al. | 711/103 |

\* cited by examiner

Primary Examiner — Ryan Bertram
(74) Attorney, Agent, or Firm — Jianq Chyun IP Office

(57) ABSTRACT

A data writing method for a rewritable non-volatile memory module is provided, the rewritable non-volatile memory module has a plurality of physical blocks, each of the physical blocks has a plurality of physical pages, a portion of the physical blocks are mapped to a plurality of logical blocks, and each of the logical blocks has a plurality of logical pages. The data writing method includes receiving data, and the data has a plurality of data bits and belongs to one of the logical pages. The data writing method also includes determining whether each of the data bits is a specific value. The data writing method further includes not writing the data into the physical pages when each of the data bits is the specific value. Thereby, the performance of a memory storage apparatus is improved.

6 Claims, 12 Drawing Sheets

FIG. 5B

| 0 | 1 | 0 | • • • • • • • • • • • | 0 |
|---|---|---|---|---|
| 0 | 0 | 0 | • • • • • • • • • • • | 0 |

750

| 0 | 0 | 0 | • • • • • • • • • • • | 0 |
|---|---|---|---|---|

FIG. 6B

DATA WRITING METHOD, MEMORY CONTROLLER, AND MEMORY STORAGE APPARATUS

CROSS-REFERENCE TO RELATED APPLICATION

This application claims the priority benefit of Taiwan application serial no. 99137281, filed on Oct. 29, 2010. The entirety of the above-mentioned patent application is hereby incorporated by reference herein and made a part of this specification.

BACKGROUND

1. Technology Field

The present invention generally relates to a data writing method, and more particularly, to a method for writing data into a rewritable non-volatile memory and a memory controller and a memory storage apparatus using the same.

2. Description of Related Art

Along with the widespread of digital cameras, cell phones, and MP3 in recently years, the consumers' demand to storage media has increased drastically. Rewritable non-volatile memory is one of the most adaptable storage media to portable electronic products (for example, notebook computers) due to its many characteristics such as data non-volatility, low power consumption, small volume, non-mechanical structure, and fast access speed. A solid state drive (SSD) is a storage apparatus which uses a flash memory as its storage medium. Thereby, the flash memory industry has become a very important part of the electronic industry in recent years.

A flash memory module has a plurality of physical blocks, and each of the physical blocks has a plurality of physical pages, wherein data has to be written into a physical block according to the sequence of the physical pages. Besides, a physical page storing data has to be erased before it is used again for writing data. In particular, because physical block is the smallest erasing unit and physical page is the smallest programming (i.e., writing) unit, a flash memory module is usually managed by grouping the physical blocks thereof into a data area and a spare area.

Physical blocks in the data area are used for storing data written by a host system. To be specific, a memory management circuit converts a logical access address accessed by the host system into a logical page of a logical block and maps the logical page of the logical block to a physical page of a physical block in the data area. Namely, in the management of the flash memory module, the physical blocks in the data area are considered as used physical blocks (for example, containing data written by the host system). The memory management circuit may record the mapping relationship between the logical blocks and the physical blocks in the data area in a logical block-physical block mapping table, wherein the logical pages of a logical block are sequentially corresponding to the physical pages of a physical block mapped to the logical block.

Physical blocks in the spare area are used for substituting physical blocks in the data area. To be specific, as described above, a physical block storing data has to be erased before it is used for writing data again, and a physical block in the spare area is used for writing the update data and substituting the physical block originally mapped to the logical block. Accordingly, the physical blocks in the spare area are blank or available blocks (i.e., no data is recorded therein or data recorded therein is marked as invalid data).

Namely, the physical pages of the physical blocks in the data area and the spare area are alternatively mapped to the logical pages of the logical blocks for storing data written by the host system. For example, the memory management circuit of a storage apparatus selects one or more physical blocks from the spare area as substitute physical blocks, and when the logical access address into which the host system is about to write an update data is corresponding to a specific logical page of a specific logical block in the storage apparatus, the memory management circuit of the storage apparatus writes the update data into a physical page of the substitute physical blocks. In addition, the memory management circuit records that this physical page stores update data of a specific logical page in a redundant bit area of the physical page or a data mapping table, and the memory management circuit marks the physical page in the data area that is originally mapped to the logical page as invalid.

Particularly, if the number of available physical blocks in the spare area is smaller than a predetermined threshold, while executing a write command, the memory management circuit has to perform a data merging procedure in order to prevent the physical blocks in the spare area from being exhausted. To be specific, during the data merging procedure, the memory management circuit gets a blank physical block from the spare area and copies valid data in the substitute physical block and in the physical block in the data area that belongs to the same logical block into the selected physical block, so that the substitute physical block or the physical block in the data area that stores only invalid data can be erased and associated with the spare area. Because during the data merging procedure, the memory management circuit has to search for the valid data belonging to the same logical block and copy the valid data belonging to the same logical block into the blank physical block, the time spent by the memory management circuit for executing a write command is considerably prolonged. Thereby, how to shorten the execution time of a write command has become one of the major subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a data writing method and a memory storage apparatus and a memory controller using the same, wherein the time of executing a write command is effectively shortened.

According to an exemplary embodiment of the present invention, a data writing method for a rewritable non-volatile memory module is provided, wherein the rewritable non-volatile memory module includes a plurality of physical blocks, each of the physical blocks has a plurality of physical pages, a portion of the physical blocks are mapped to a plurality of logical blocks, and each of the logical blocks has a plurality of logical pages. The data writing method includes receiving data, wherein the data has a plurality of data bits and belongs to one of the logical pages. The data writing method also includes determining whether each of the data bits is a specific value. The data writing method further includes not writing the data into the physical pages when each of the data bits is the specific value.

According to an exemplary embodiment of the present invention, a memory controller for managing a rewritable non-volatile memory module is provided, wherein the rewritable non-volatile memory module has a plurality of physical blocks, and each of the physical blocks has a plurality of physical pages. The memory controller includes a host interface, a memory interface, and a memory management circuit. The host interface is configured to couple to a host system. The memory interface is configured to couple to the rewritable non-volatile memory module. The memory management circuit is coupled to the host interface and the memory interface. The memory management circuit configures a plurality of logical blocks to be mapped to a portion of the physical blocks, wherein each of the logical blocks has a plurality of logical pages. In addition, the memory management circuit receives data from the host system, wherein the data has a plurality of data bits and belongs to one of the logical pages. Moreover, the memory management circuit determines whether each of the data bits is a specific value, wherein the memory management circuit does not write the data into the physical pages when each of the data bits is the specific value.

According to an exemplary embodiment of the present invention, a memory storage apparatus including a connector, a rewritable non-volatile memory module, and a memory controller is provided. The connector is configured to couple to a host system. The rewritable non-volatile memory module has a plurality of physical blocks, and each of the physical blocks has a plurality of physical pages. The memory controller is coupled to the connector and the rewritable non-volatile memory module. The memory controller configures a plurality of logical blocks to be mapped to a portion of the physical blocks, wherein each of the logical blocks has a plurality of logical pages. In addition, the memory controller receives data from the host system, wherein the data has a plurality of data bits and belongs to one of the logical pages. Moreover, the memory controller determines whether each of the data bits is a specific value, wherein the memory controller does not write the data into the physical pages when each of the data bits is the specific value.

Thereby, the data writing method and the memory storage apparatus and the memory controller using the same according to the exemplary embodiments can effectively shorten the time of executing a write command, thereby improving the performance of the memory storage apparatus.

It should be understood, however, that this Summary may not contain all of the aspects and embodiments of the present invention, is not meant to be limiting or restrictive in any manner, and that the present invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

FIG. 5B illustrates an example of a data identification table based on the regular writing procedure in FIG. 5A.

FIG. 6B illustrates an example of a data identification table based on the special writing procedure in FIG. 6A.

DESCRIPTION OF THE EMBODIMENTS

Figure 1A:
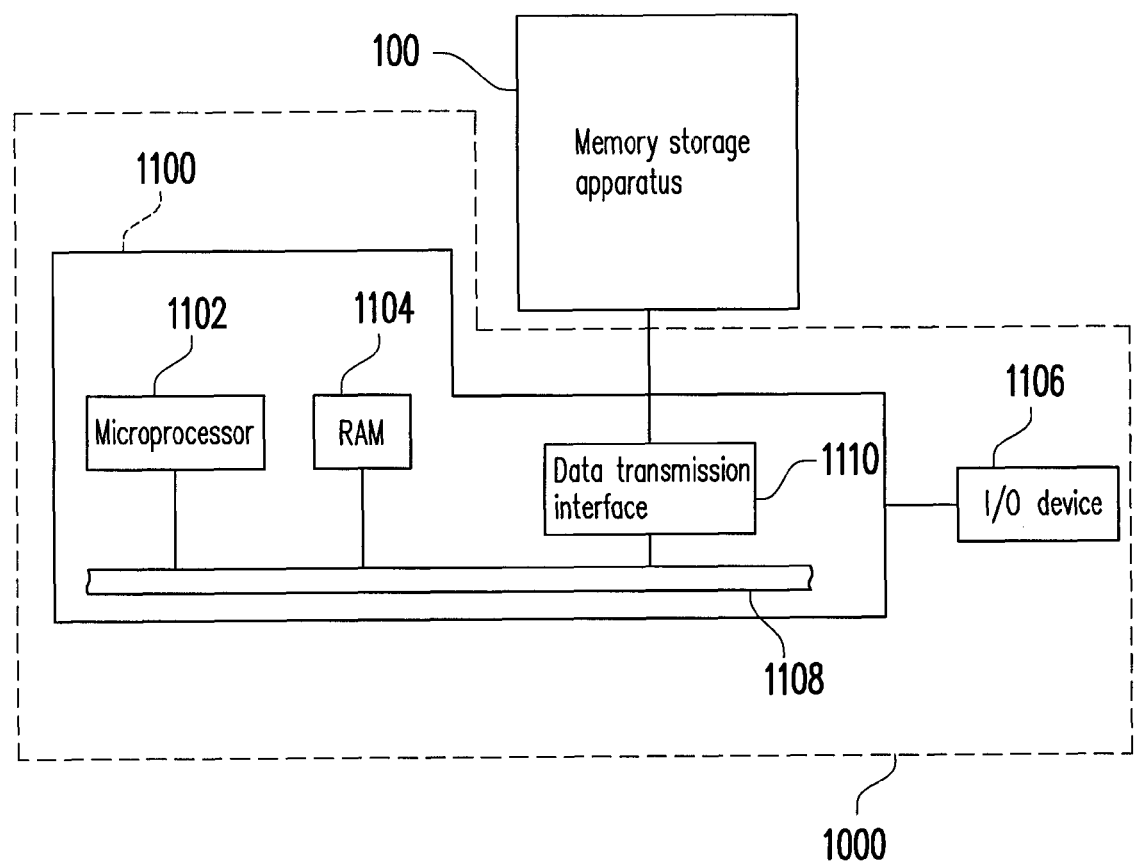
FIG. 1A illustrates a host system and a memory storage apparatus according to a first exemplary embodiment of the present invention.

Reference will now be made in detail to the present preferred embodiments of the present invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In order to shorten the time of executing a write command, in the data writing method provided by the present invention, whether the data to be written by a host system is a specific value (also referred to as a predetermined pattern) is determined, and the data is not actually written into a rewritable non-volatile memory module of a memory storage apparatus when the data is the specific value. To be specific, when the memory storage apparatus is used as the primary disk (i.e., the disk for installing an operating system (OS)) of a computer system, the OS frequently updates a small quantity of data.

For example, when data related to a file system is updated, only part of the data is updated, while the other part of the data remains as "0" (i.e., this part of data has no meaning (pattern). In the data writing method provided by the present invention, such data is not actually written into a rewritable non-volatile memory module so that meaningless data writing procedure (programming procedure) is avoided and the time of executing write commands is shortened. Below, exemplary embodiments of the present invention will be described in detail.

[First Exemplary Embodiment]

Generally speaking, a memory storage apparatus (also referred to as a memory storage system) includes a rewritable non-volatile memory module and a controller (also referred to as a control circuit). The memory storage apparatus is usually used together with a host system so that the host system can write data into the memory storage apparatus or reads data from the same.

FIG. 1A illustrates a host system and a memory storage apparatus according to the first exemplary embodiment of the present invention.

Figure 1B:
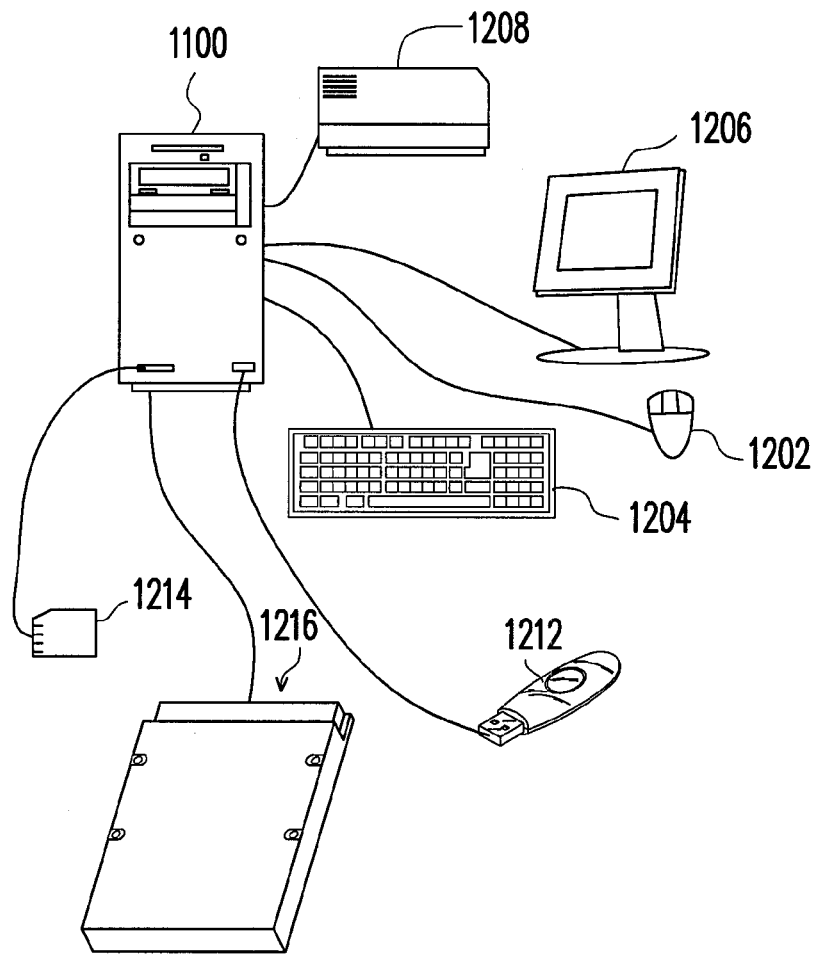
FIG. 1B is a diagram of a computer, an input/output (I/O) device, and a memory storage apparatus according to an exemplary embodiment of the present invention.

Referring to FIG. 1A, the host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. It should be understood that the devices illustrated in FIG. 1B are not intended to limit the I/O device 1106, and the I/O device 1106 may further include other devices.

In the present embodiment, the memory storage apparatus 100 is coupled to other components of the host system 1000 through the data transmission interface 1110. Data can be written into or read from the memory storage apparatus 100 through the operations of the microprocessor 1102, the RAM 1104, and the I/O device 1106. The memory storage apparatus 100 may be a rewritable non-volatile memory storage apparatus, such as the flash drive 1212, the memory card 1214, or the solid state drive (SSD) 1216 in FIG. 1B.

Figure 1C:
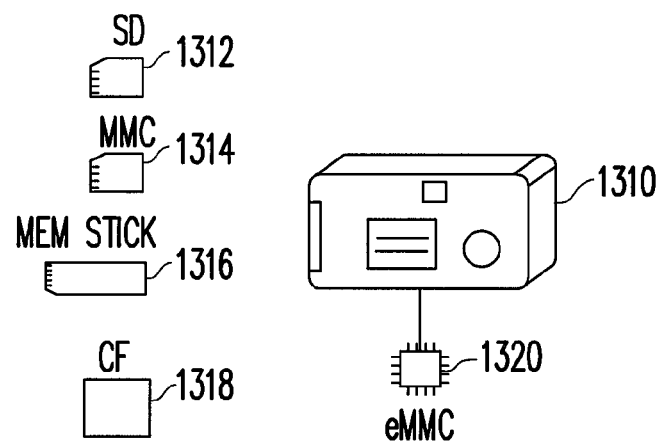
FIG. 1C is a diagram of a host system and a memory storage apparatus according to another exemplary embodiment of the present invention.

Generally speaking, the host system 1000 may be substantially any system that can store data by using the memory storage apparatus 100. Even though the host system 1000 is described as a computer system in the present exemplary embodiment, in another exemplary embodiment of the present invention, the host system 1000 may also be a digital camera, a video camera, a communication device, an audio player, or a video player. For example, if the host system is a digital camera (video camera) 1310, the rewritable non-volatile memory storage apparatus is a secure digital (SD) card 1312, a multi media card (MMC) card 1314, a memory stick (MS) 1316, a compact flash (CF) card 1318, or an embedded storage apparatus 1320 (as shown in FIG. 1C) used by the digital camera (video camera) 1310. The embedded storage apparatus 1320 includes an embedded MMC (eMMC). It should be mentioned that the eMMC is directly coupled to the motherboard of the host system.

Figure 2:
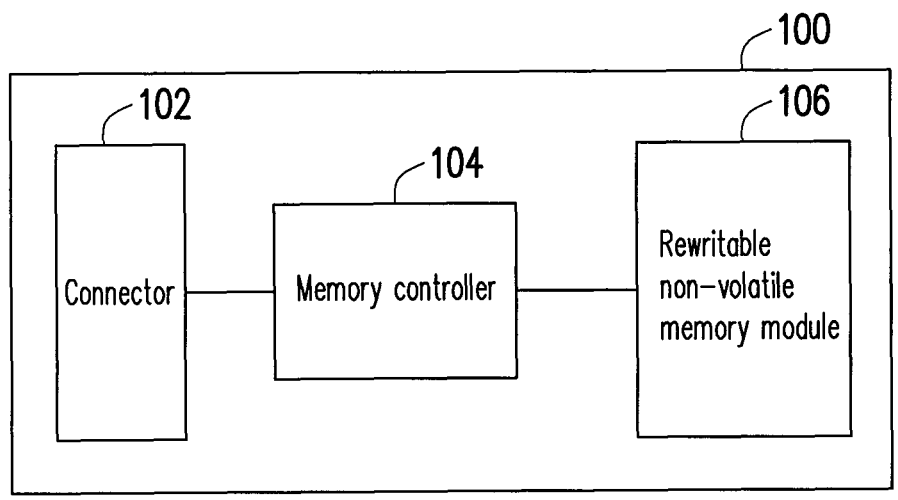
FIG. 2 is a schematic block diagram of the memory storage apparatus in FIG. 1A.

FIG. 2 is a schematic block diagram of the memory storage apparatus in FIG. 1A.

Referring to FIG. 2, the memory storage apparatus 100 includes a connector 102, a memory controller 104, and a rewritable non-volatile memory module 106.

In the present exemplary embodiment, the connector 102 is compatible to the Serial Advanced Technology Attachment (SATA) standard. However, the present invention is not limited thereto, and the connector 102 may also be compatible to the Institute of Electrical and Electronic Engineers (IEEE) 1394 standard, the peripheral component interconnect (PCI) express standard, the universal serial bus (USB) standard, the SD standard, the MS standard, the MMC standard, the CF standard, the integrated device electronics (IDE) standard, or any other suitable standard.

The memory controller 104 executes a plurality of logic gates or control instructions implemented in a hardware form or a firmware form, and which performs various data operations on the rewritable non-volatile memory module 106 according to instructions of the host system 1000. In the present exemplary embodiment, the memory controller 104 writes data into the rewritable non-volatile memory module 106 according to the data writing method provided by the present exemplary embodiment. Below, the data writing method in the present exemplary embodiment will be described in detail with reference to accompanying drawings.

The rewritable non-volatile memory module 106 is coupled to the memory controller 104 and has a plurality of physical blocks for storing data written by the host system 1000. In the present exemplary embodiment, each physical block has a plurality of physical pages, wherein the physical pages belonging to the same physical block can be individually written but have to be erased all together. Each physical block may be composed of 128 physical pages, and the capacity of each physical page may be 4 kilobytes (K). However, the present invention is not limited thereto, and each physical block may also be composed of 64 physical pages, 256 physical pages, or any other number of physical pages.

To be specific, a physical block is the smallest erasing unit. Namely, each physical block contains the least number of memory cells that are erased together. A physical page is the smallest programming unit. Namely, a physical page is the smallest unit for writing data. However, in another exemplary embodiment of the present invention, the smallest unit for writing data may also be a sector or other units. Each physical page usually includes a data bit area and a redundant bit area. The data bit area is used for storing user data, and the redundant bit area is used for storing system data (for example, error checking and correcting (ECC) codes).

In the present exemplary embodiment, the rewritable non-volatile memory module 106 is a multi level cell (MLC) NAND flash memory module. However, the present invention is not limited thereto, and the rewritable non-volatile memory module 106 may also be a single level cell (SLC) NAND flash memory module, any other flash memory module, or any other memory module having the same characteristics.

Figure 3:
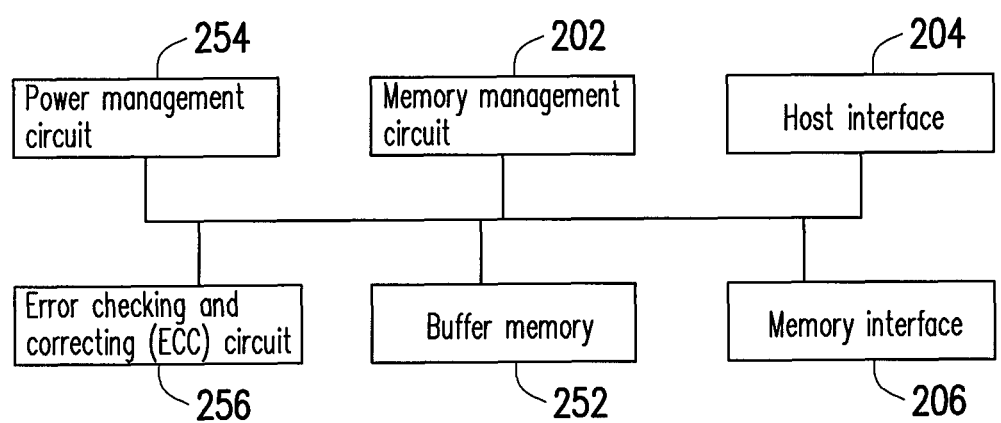
FIG. 3 is a schematic block diagram of a memory controller according to the first exemplary embodiment of the present invention.

FIG. 3 is a schematic block diagram of a memory controller according to the first exemplary embodiment of the present invention.

Referring to FIG. 3, the memory controller 104 includes a memory management circuit 202, a host interface 204, and a memory interface 206.

The memory management circuit 202 controls the operation of the memory controller 104. To be specific, the memory management circuit 202 has a plurality of control instructions, and when the memory storage apparatus 100 is in operation, the control instructions are executed to write data into the rewritable non-volatile memory module 106 through the data writing method in the present exemplary embodiment.

In the present exemplary embodiment, the control instructions of the memory management circuit 202 are implemented in a firmware form. For example, the memory management circuit 202 has a microprocessor unit (not shown) and a read-only memory (ROM, not shown), and the control instructions are burnt into the ROM. When the memory storage apparatus 100 is in operation, the control instructions are executed by the microprocessor unit to accomplish the data writing method in the present exemplary embodiment.

In another exemplary embodiment of the present invention, the control instructions of the memory management circuit 202 may also be stored into a specific area (for example, a system area used exclusively for storing system data in a memory module) of the rewritable non-volatile memory module 106 as program codes. In addition, the memory management circuit 202 has a microprocessor unit (not shown), a ROM (not shown), and a RAM (not shown). In particular, the ROM has a driving code segment, and when the memory controller 104 is enabled, the microprocessor unit first executes the driving code segment to load the control instructions from the rewritable non-volatile memory module 106 into the RAM of the memory management circuit 202. After that, the microprocessor unit runs these control instructions to accomplish the data writing method in the present exemplary embodiment. In yet another exemplary embodiment of the present invention, the control instructions of the memory management circuit 202 may also be implemented in a hardware form.

The host interface 204 is coupled to the memory management circuit 202 and configured to receive and identify commands and data from the host system 1000. Namely, data and commands from the host system 1000 are transmitted to the memory management circuit 202 through the host interface 204. In the present exemplary embodiment, the host interface 204 is compatible to the SATA standard. However, the present invention is not limited thereto, and the host interface 204 may also be compatible to the PATA standard, the IEEE 1394 standard, the PCI express standard, the USB standard, the SD standard, the MS standard, the MMC standard, the CF standard, the IDE standard, or any other suitable data transmission standard.

The memory interface 206 is coupled to the memory management circuit 202 and configured to access the rewritable non-volatile memory module 106. Namely, data to be written into the rewritable non-volatile memory module 106 is converted by the memory interface 206 into a format acceptable to the rewritable non-volatile memory module 106.

In an exemplary embodiment of the present invention, the memory controller 104 further includes a buffer memory 252. The buffer memory 252 is coupled to the memory management circuit 202 and used for temporarily storing data and commands from the host system 1000 or data from the rewritable non-volatile memory module 106.

In an exemplary embodiment of the present invention, the memory controller 104 further includes a power management circuit 254. The power management circuit 254 is coupled to the memory management circuit 202 and configured to control the power supply of the memory storage apparatus 100.

In an exemplary embodiment of the present invention, the memory controller 104 further includes an ECC circuit 256. The ECC circuit 256 is coupled to the memory management circuit 202 and configured to execute an ECC procedure to ensure data accuracy. To be specific, when the memory management circuit 202 receives a write command from the host system 1000, the ECC circuit 256 generates a corresponding ECC code for the data corresponding to the write command, and the memory management circuit 202 writes the data corresponding to the write command and the corresponding ECC code into the rewritable non-volatile memory module 106. Subsequently, when the memory management circuit 202 reads data from the rewritable non-volatile memory module 106, it also reads the ECC code corresponding to the data, and the ECC circuit 256 executes the ECC procedure on the data according to the ECC code.

Figure 4A:
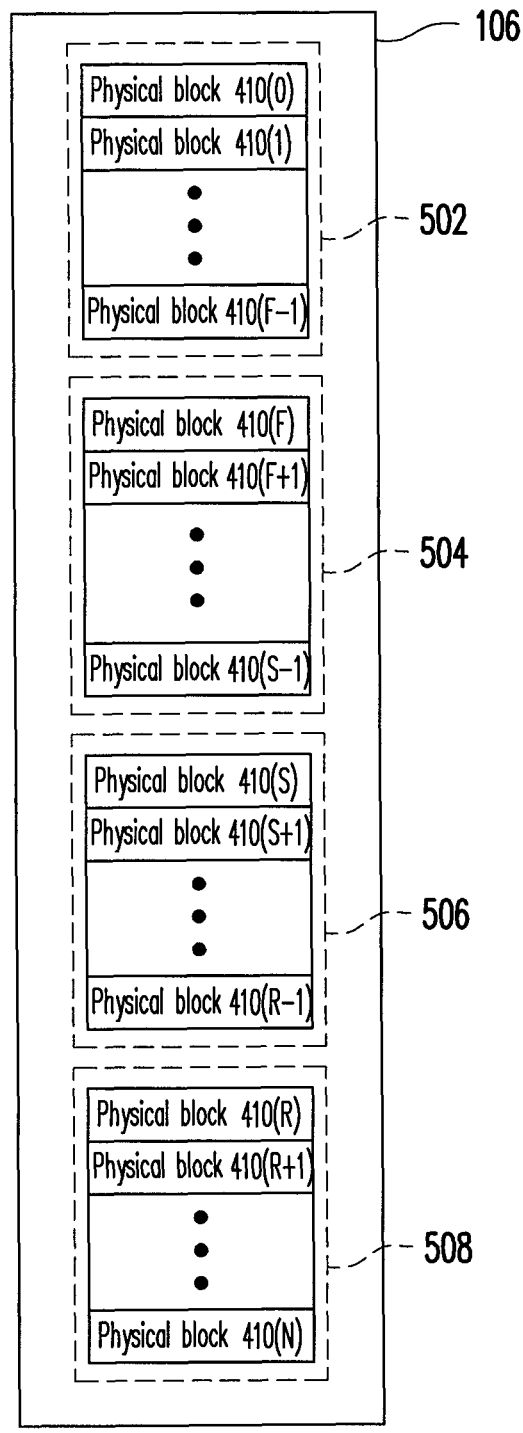
FIG. 4A and FIG. 4B are diagrams illustrating how physical blocks of a rewritable non-volatile memory module are managed according to the first exemplary embodiment of the present invention.
Figure 4B:
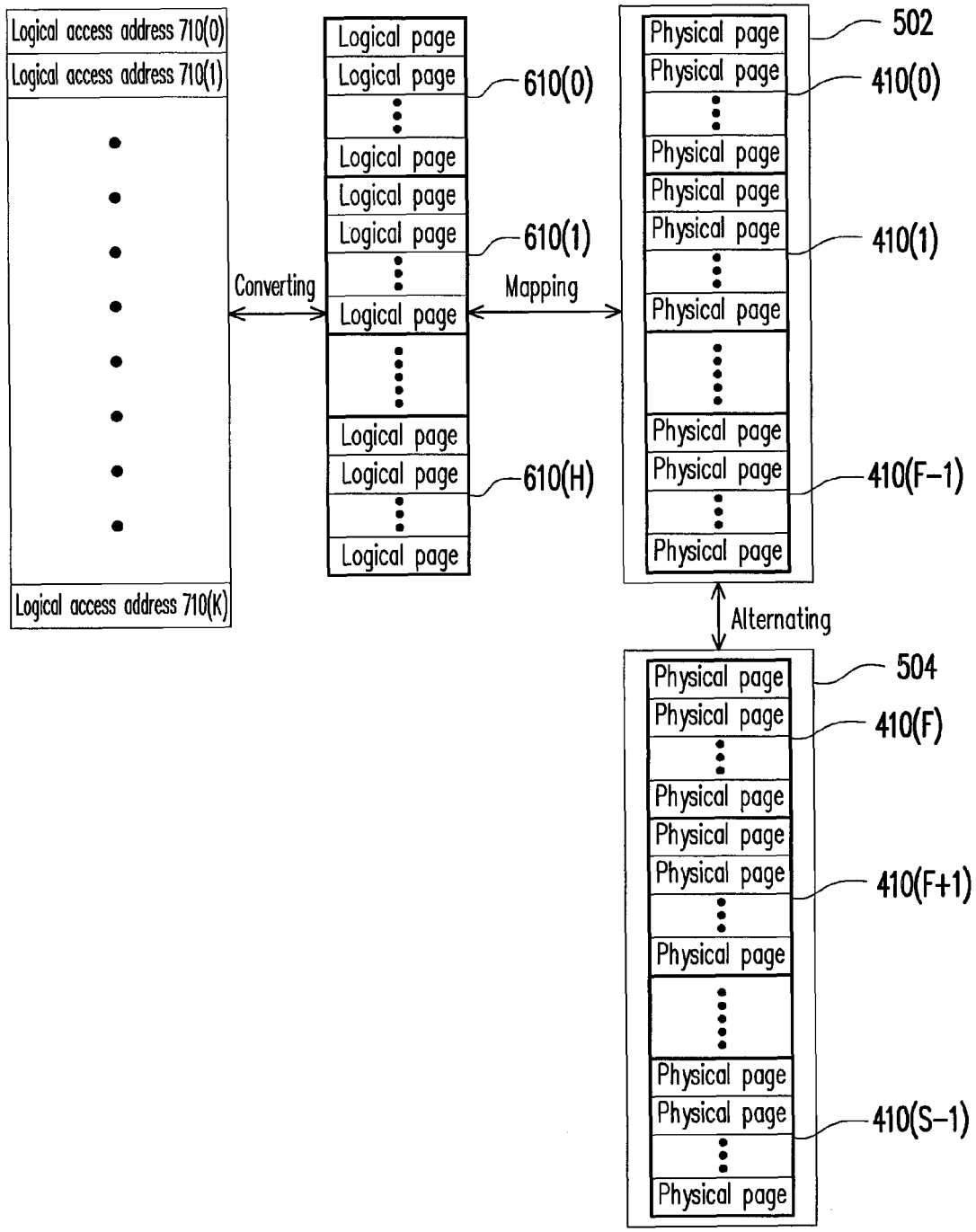

FIG. 4A and FIG. 4B are diagrams illustrating how physical blocks of a rewritable non-volatile memory module are managed according to the first exemplary embodiment of the present invention.

Referring to FIG. 4A, the rewritable non-volatile memory module 106 has physical blocks 410(0)-410(N), and the memory management circuit 202 of the memory controller 104 logically groups the physical blocks 410(0)-410(N) into a data area 502, a spare area 504, a system area 506, and a replacement area 508.

The physical blocks logically belonging to the data area 502 and the spare area 504 are used for storing data from the host system 1000. To be specific, the physical blocks in the data area 502 are physical blocks which have stored data, and the physical blocks in the spare area 504 are used for substituting the physical blocks in the data area 502. Namely, when a write command and data to be written are received from the host system 1000, the memory management circuit 202 gets a physical block from the spare area 504 and writes the data into the gotten physical block to substitute a physical block in the data area 502.

The physical blocks logically belonging to the system area 506 are used for recording system data, such as the manufacturer and model of the rewritable non-volatile memory module, the number of physical blocks of the rewritable non-volatile memory module, and the number of physical pages in each physical block.

The physical blocks logically belonging to the replacement area 508 are used in a bad physical block replacement procedure for replacing damaged physical blocks (also referred to as "bad physical blocks"). To be specific, if there are still normal physical blocks in the replacement area 508 and a physical block in the data area 502 is damaged, the memory management circuit 202 gets a normal physical block from the replacement area 508 to replace the bad physical block.

It should be mentioned that in the present exemplary embodiment, the memory management circuit 202 manages the rewritable non-volatile memory module 106 in units of each physical block. However, the present invention is not limited thereto, and in another exemplary embodiment, the memory management circuit 202 may also group the physical blocks into a plurality of physical units and manage the rewritable non-volatile memory module 106 in units of each physical unit. Each physical unit may be composed of at least one physical block in a single sub memory module or different sub memory modules.

Referring to FIG. 4B, the memory management circuit 202 configures logical blocks 610(0)-610(H) to be mapped to the physical blocks in the data area 502, wherein each of the logical blocks has a plurality of logical pages, and the logical pages are sequentially mapped to the physical pages of the corresponding physical block. The memory management circuit 202 may maintain a logical block-physical block mapping table to record the mapping relationship between the logical blocks 610(0)-610(H) and the physical blocks in the data area 502. In addition, because the host system 1000 accesses data in unit of each logical access address (for example, sector), when the host system 1000 accesses data, the memory management circuit 202 converts the logical access addresses 710(0)-710(K) corresponding to the memory storage apparatus 100 into corresponding logical pages. For example, when the host system 1000 is about to access a specific logical access address, the memory management circuit 202 converts the logical access address accessed by the host system 1000 into a multidimensional address formed by the corresponding logical block and logical page and accesses data in the corresponding physical page based on the logical block-physical block mapping table.

In the present exemplary embodiment, the memory management circuit 202 processes data to be stored by the host system 1000 through a regular writing procedure or a special writing procedure according to the pattern of the data.

To be specific, when data belonging to a specific logical page (also referred to as update data) is to be written into a physical page, the memory management circuit 202 determines whether each data bit of the update data is a specific value (or pattern). When each data bit of the update data is the specific value, the memory management circuit 202 processes the update data through the special writing procedure, and when any data bit of the update data is not the specific value, the memory management circuit 202 writes the update data through the regular writing procedure. In the present exemplary embodiment, the specific value is "0". Namely, when all the data bits of the update data are "0", the memory management circuit 202 processes the update data through the special writing procedure. However, the specific value is not limited to "0", and in another exemplary embodiment of the present invention, the specific value may be any other pattern.

In the regular writing procedure of the present exemplary embodiment, the memory management circuit 202 gets a physical unit from the spare area 504 as a substitute physical block and writes the update data belonging to the same logical page into one of the physical pages of the gotten substitute physical block according to the sequence of the physical pages.

In addition, in the special writing procedure of the present exemplary embodiment, the memory management circuit 202 does not write the update data into the physical blocks. In the present exemplary embodiment, the memory management circuit 202 may configure a data identification table to record which logical pages contain data which is the specific value. To be specific, the data identification table is composed of a plurality of bits, and each of the bits is corresponding one of the logical pages. When each data bit of the update data is the specific value, the memory management circuit 202 identifies the logical page corresponding to the update data and sets the bit corresponding to the logical page to a tag value in the data identification table instead of actually writing the update data into the physical page mapped to the logical page. For example, all the bits in the data identification table are initially set to "0", and the tag value is "1". However, the present invention is not limited thereto, and any symbol or value can be used as the tag value.

Figure 5A:
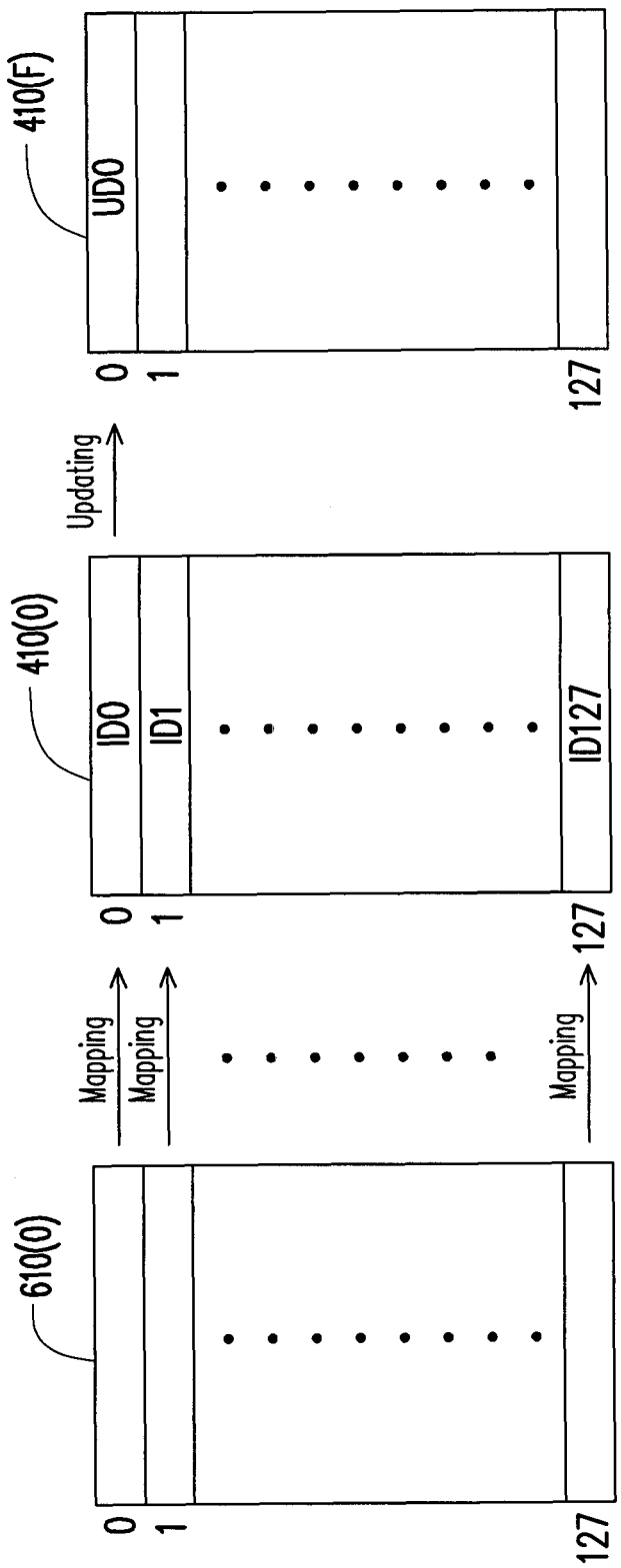
FIG. 5A illustrates an example of a regular writing procedure according to the first exemplary embodiment of the present invention.

FIG. 5A illustrates an example of a regular writing procedure according to the first exemplary embodiment of the present invention.

Referring to FIG. 5A, if the physical pages of the physical block 410(0) currently store data ID0-ID127 of the logical block 610(0) (i.e., the logical block 610(0) is currently mapped to the physical block 410(0)) and the host system 1000 is about to write data UD0 that is not the specific value into the $0^{th}$ logical page of the logical block 610(0), the memory management circuit 202 identifies that the data UD0 is not the specific value, gets a physical block (for example, the physical block 410(F)) from the spare area 504, and writes the data UD0 into the $0^{th}$ physical page of the physical block 410(F). In addition, the memory management circuit 202 records the information about that the update data in the $0^{th}$ logical page of the logical block 610(0) has been written into the $0^{th}$ physical page of the physical block 410(F) so that later on the update data can be successfully read.

Figure 5B:
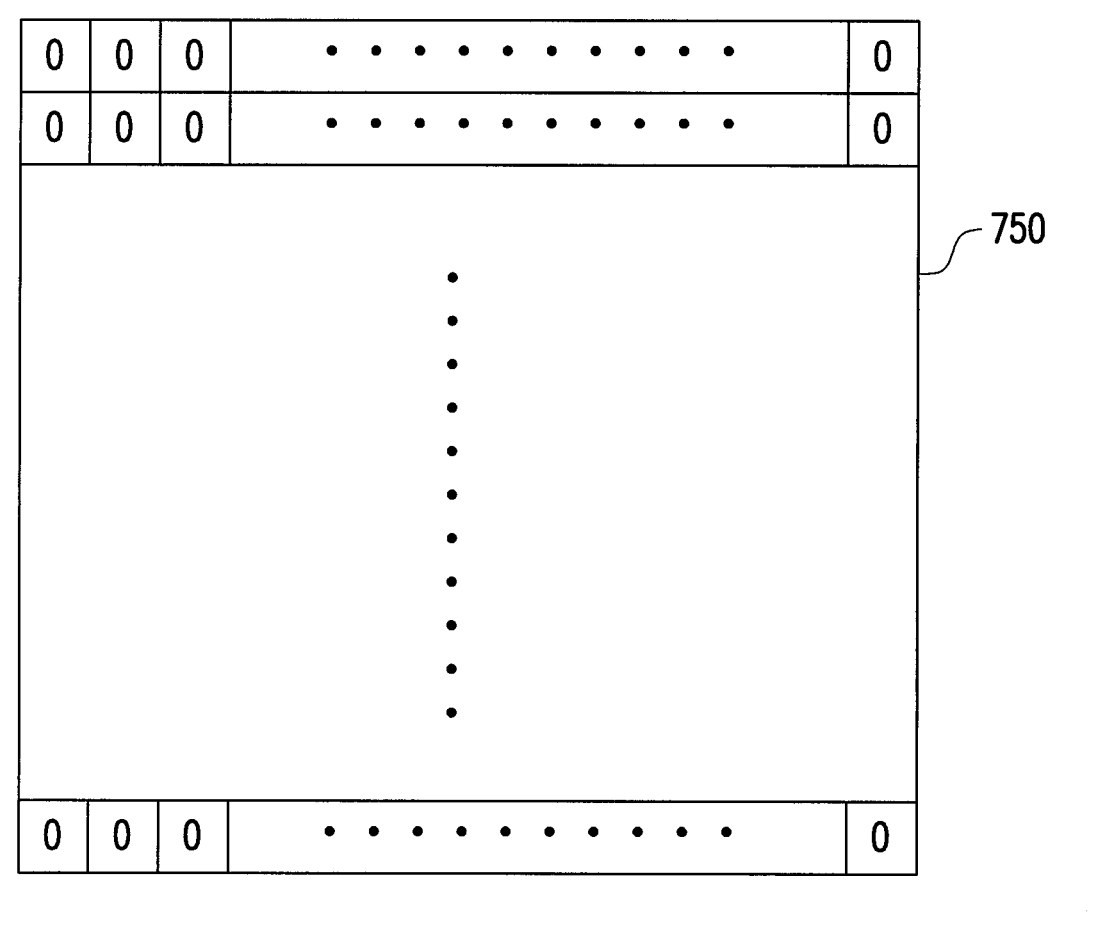

FIG. 5B illustrates an example of a data identification table based on the regular writing procedure in FIG. 5A.

Referring to FIG. 5B, the data identification table 750 is composed of bits (i.e., the blocks in FIG. 5B) that are arranged into a 2-dimensional array, wherein each row is corresponding to a logical block, and the bits in each row are sequentially (from left to right) corresponding to each of the logical pages of the corresponding logical block. Each bit in the data identification table 750 is initially set to "0".

Figure 6A:
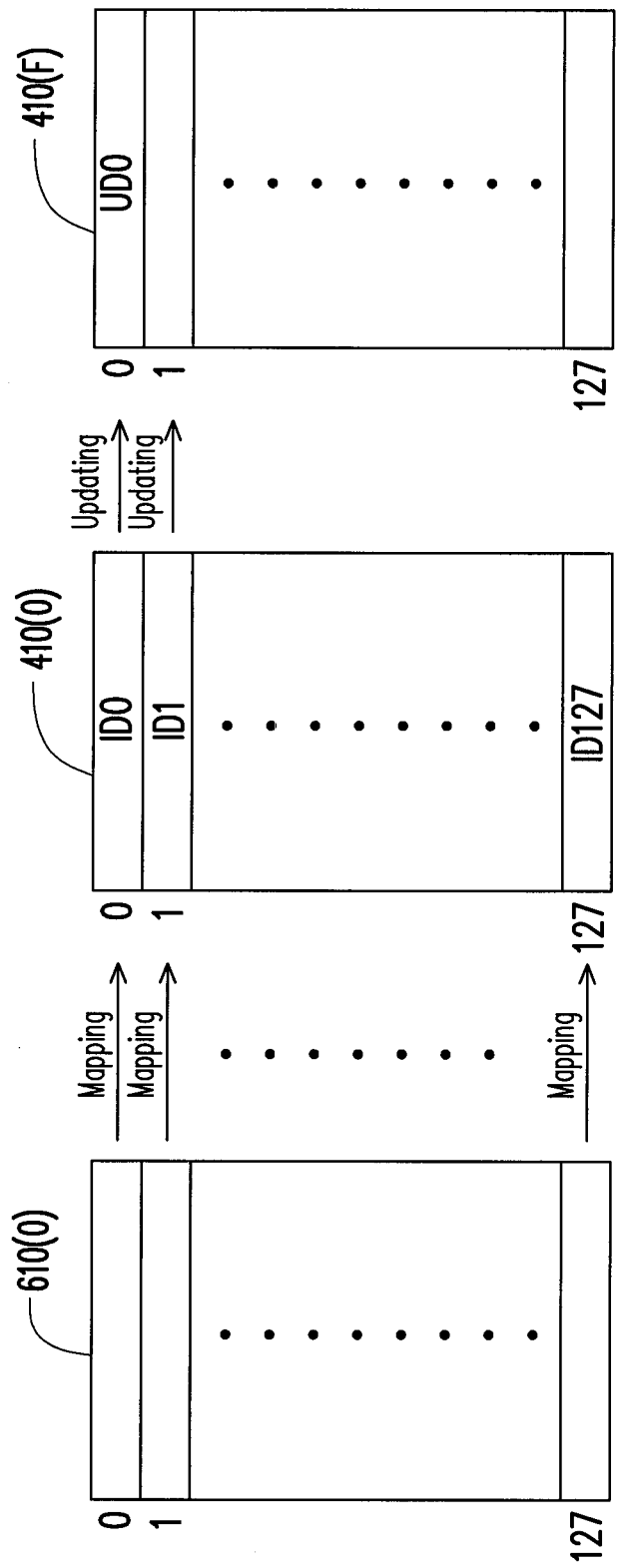
FIG. 6A illustrates an example of a special writing procedure according to the first exemplary embodiment of the present invention.

FIG. 6A illustrates an example of a special writing procedure according to the first exemplary embodiment of the present invention.

Referring to FIG. 6A, if the host system 1000 is about to write data UD1 that is the specific value into the $1^{st}$ logical page of the logical block 610(0) in the storage state illustrated in FIG. 5A, the memory management circuit 202 identifies that the data UD1 is the specific value and does not actually write the data UD1 into the $1^{st}$ physical page of the physical block 410(F). Instead, the memory management circuit 202 sets the corresponding bit in the data identification table to the tag value.

Figure 6B:
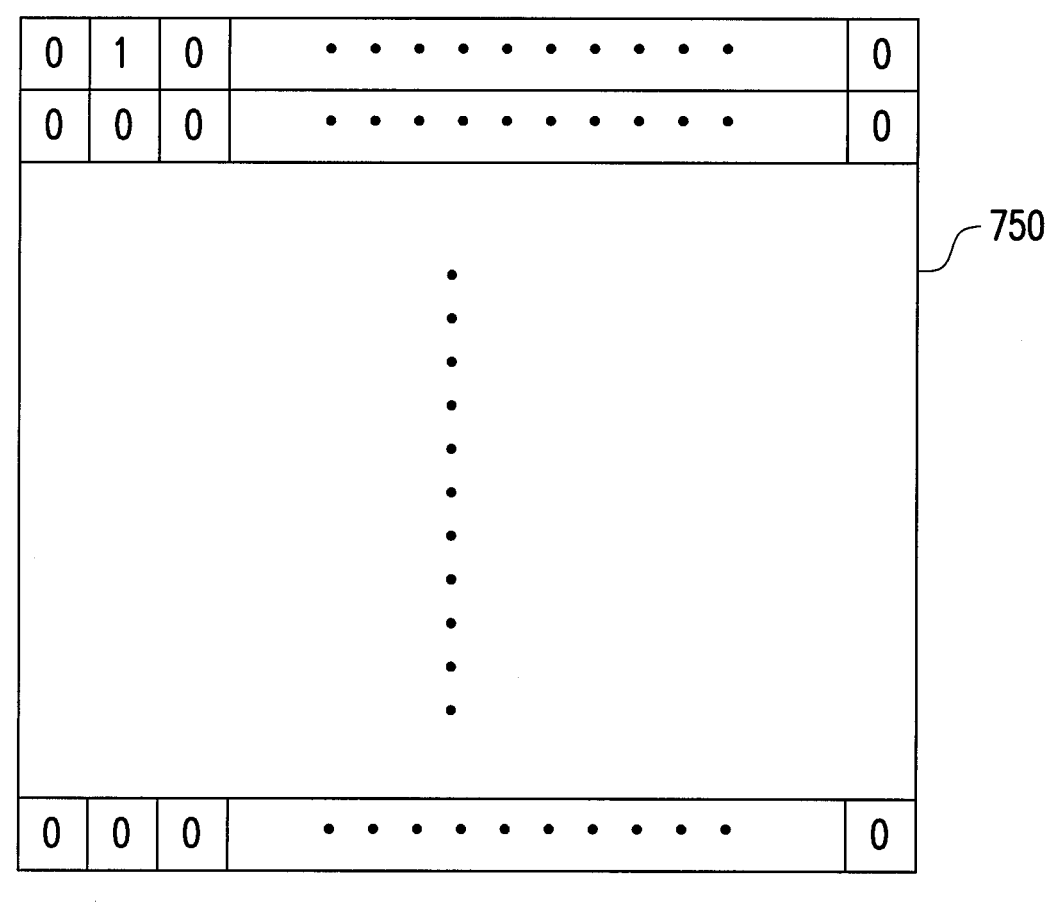

FIG. 6B illustrates an example of a data identification table based on the special writing procedure in FIG. 6A.

Referring to FIG. 6B, the memory management circuit 202 sets the bit in the data identification table 750 that is corresponding to the $1^{st}$ logical page of the logical block 610(0) to "1".

Thereby, in the present exemplary embodiment, when all the data bits in the data to be written by the host system 1000 are "0", the memory management circuit 202 does not execute any writing procedure (also referred to as a programming procedure) on the rewritable non-volatile memory module 106. Instead, the memory management circuit 202 sets the corresponding bit in the data identification table to the tag value so that the time for executing a write command is greatly shortened. It should be mentioned that when the host system 1000 gives a read command, the memory management circuit 202 determines whether the bit corresponding to the logical page to be read is set to the tag value according to the data identification table. Besides, if the bit corresponding to the logical page to be read is already set to the tag value, the memory management circuit 202 directly sends the specific value to the host system 1000.

Figure 7:
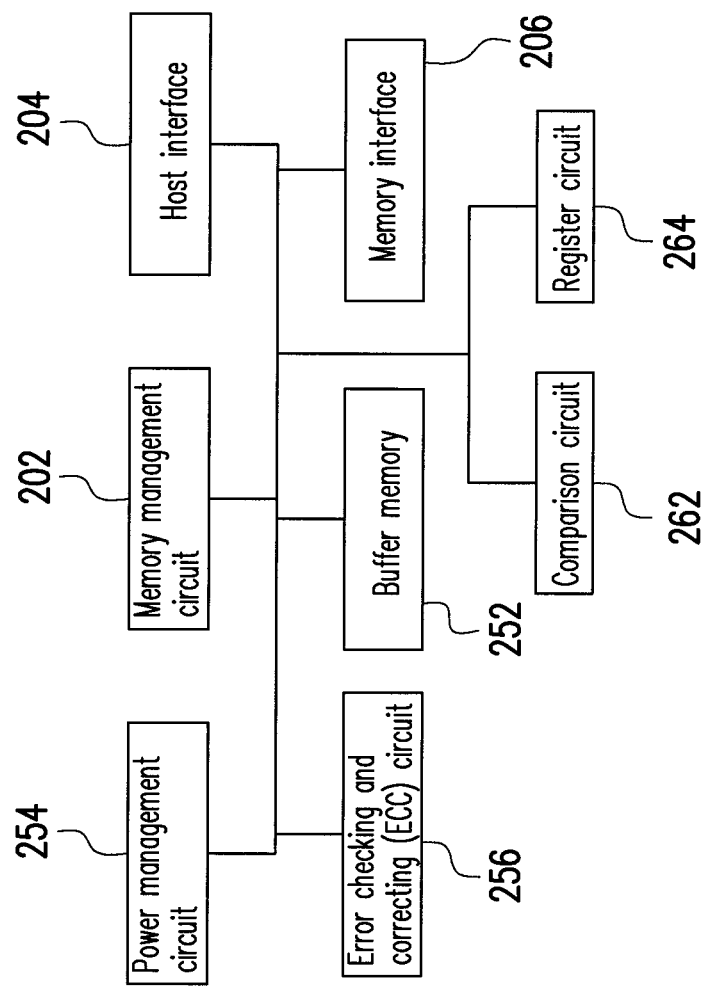
FIG. 7 is a schematic block diagram of a memory controller according to another exemplary embodiment of the present invention.

It should be mentioned that in another exemplary embodiment of the present invention, the memory controller 104 further includes a comparison circuit 262 and a register circuit 264 (as shown in FIG. 7). The comparison circuit 262 determines whether each data bit of the update data is the specific value, and when all the data bits of the update data are the specific value, the comparison circuit 262 stores a flag value into the register circuit 264. Particularly, the memory management circuit 202 identifies that the update data is the specific value according to the flag value stored in the register circuit 264.

Figure 8:
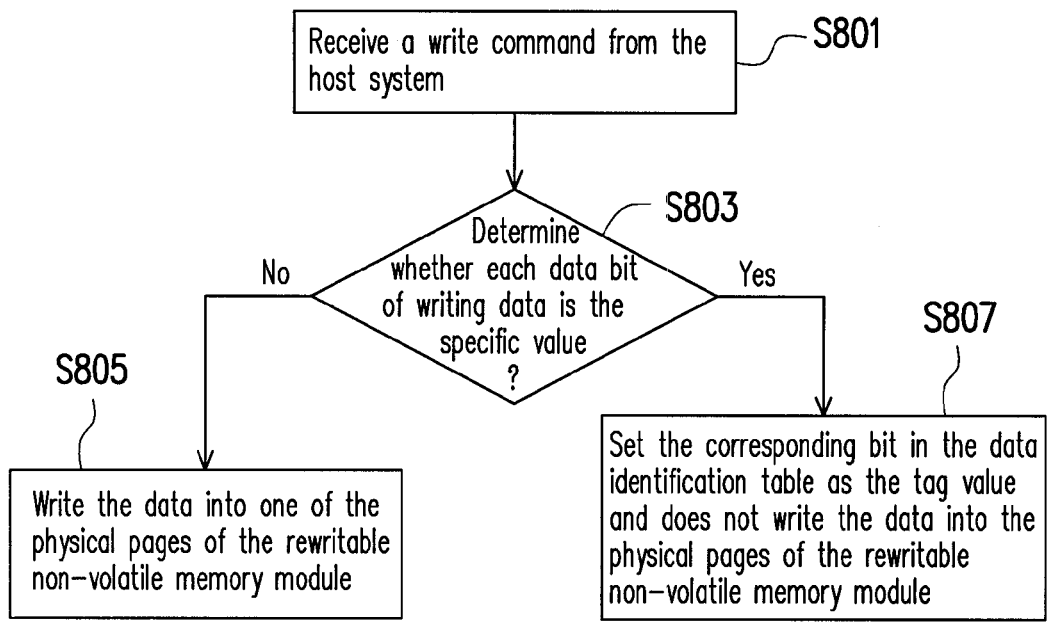
FIG. 8 is a flowchart of a data writing method according to the first exemplary embodiment of the present invention.

FIG. 8 is a flowchart of a data writing method according to the first exemplary embodiment of the present invention.

Referring to FIG. 8, in step S801, the memory management circuit 202 of the memory controller 104 receives a write command from the host system 1000, and in step S803, the memory management circuit 202 determines whether each data bit of writing data is the specific value.

It should be mentioned that the capacity of data received from the host system 1000 may be smaller than that of a logical page. However, as described above, the memory management circuit 202 writes data in unit of physical page. Thus, in the case that the capacity of data received from the host system 1000 may be smaller than that of a logical page, the data is temporarily stored in the buffer memory 252, and subsequently, the data is written into the rewritable non-volatile memory module 106 in unit of each physical page. Accordingly, the size of the data to be written in step S803 is equal to the size of one physical page.

If any data bit in the data to be written is not the specific value, in step S805, the memory management circuit 202 writes the data into one of the physical pages of the rewritable non-volatile memory module 106. For example, the memory management circuit 202 writes the data through the regular writing procedure. The regular writing procedure has been described in detail with reference to accompanying drawings therefore will not be described herein.

If each data bit of the data to be written is the specific value, in step S807, the memory management circuit 202 sets the corresponding bit in the data identification table to the tag value and does not write the data into the physical pages of the rewritable non-volatile memory module 106.

Figure 9:
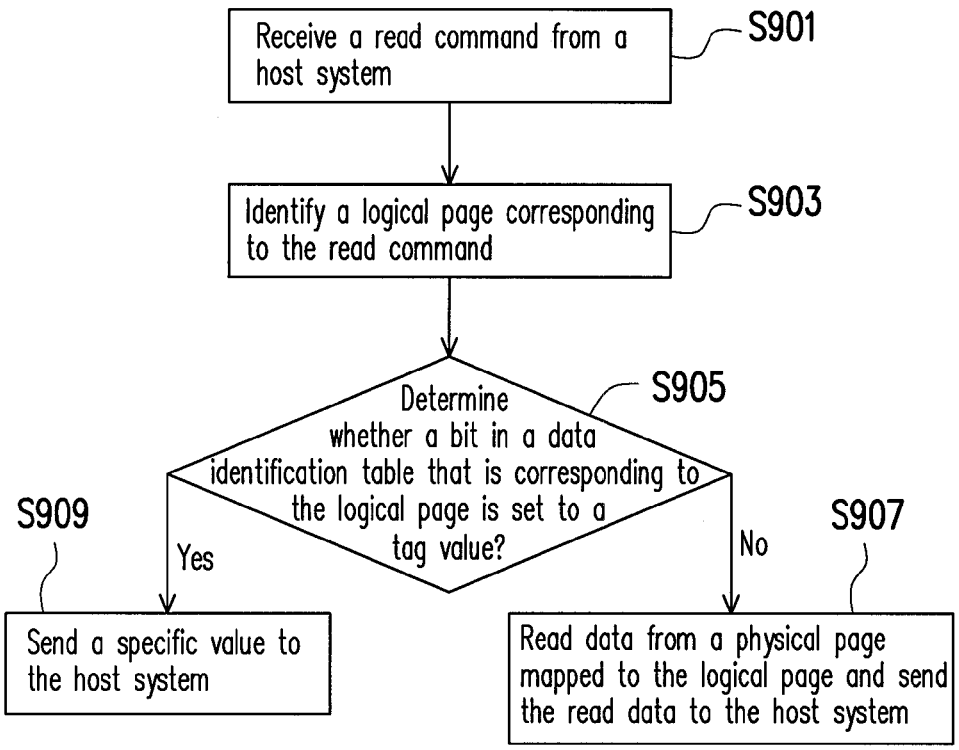
FIG. 9 is a flowchart of a data reading method according to the first exemplary embodiment of the present invention.

FIG. 9 is a flowchart of a data reading method according to the first exemplary embodiment of the present invention.

Referring to FIG. 9, in step S901, the memory management circuit 202 of the memory controller 104 receives a read command from the host system 1000. In step S903, the memory management circuit 202 identifies the logical page corresponding to the read command. To be specific, in step S903, the memory management circuit 202 converts the logical access address in the read command into a corresponding logical page.

Next, in step S905, the memory management circuit 202 determines whether the bit in the data identification table that is corresponding to the logical page is set to a tag value.

If the bit in the data identification table that is corresponding to the logical page is not set to the tag value, in step S907, the memory management circuit 202 reads data from the physical page mapped to the logical page and sends the read data to the host system 1000.

If the bit in the data identification table that is corresponding to the logical page is set to the tag value, in step S909, the memory management circuit 202 sends the specific value to the host system 1000.

[Second Exemplary Embodiment]

The memory storage apparatus and the host system in the second exemplary embodiment of the present invention are substantially the same as the memory storage apparatus and the host system in the first exemplary embodiment, and the difference is that the memory controller in the second exemplary embodiment does not configure the data identification table but records the tag value in a trim table. Below, the difference between the second exemplary embodiment and the first exemplary embodiment will be explained with reference to FIG. 1A, FIG. 2, and FIG. 3.

In the file management mechanism adopted by the OS of the host system 1000, the OS manages data stored in the storage apparatus through a file allocation table (FAT). In particular, when the OS deletes data, the OS simply marks the data in the logical access address to be deleted as invalid data in the FAT. Namely, the OS does not actually delete the data. Thereafter, when the OS is about to write data into the logical access address, the OS directly writes the data.

In the present exemplary embodiment, the memory management circuit 202 receives a deletion record from the host system 1000, wherein the deletion record records information about which logical access addresses store deleted data. To the OS of the host system 1000, those logical access addresses corresponding to deleted data are referred to as deleted logical access addresses. In the present exemplary embodiment, the OS of the host system 1000 is Microsoft Windows 7. The Microsoft Windows 7 transmits a deletion record through a trim command, and the host interface 204 and the memory management circuit 202 can support and identify the trim command.

Particularly, in the present exemplary embodiment, the memory management circuit 202 configures a trim table to record those logical pages containing deleted data. To be specific, the trim table is composed of a plurality of bits, and each bit is corresponding to one of the logical pages. When a trim command is received, the memory management circuit 202 sets the bit in the trim table that is corresponding to the logical page corresponding to the trim command to a tag value, so as to indicate that the data stored in this logical page has been deleted by the host system 1000. All the bits in the trim table may be initially set to "0", and the tag value may be "1".

In the present exemplary embodiment, when each data bit of the update data is the specific value, the memory management circuit 202 does not really write the update data into the physical page mapped to the logical page but updates the trim table to set the bit in the trim table that is corresponding to the logical page corresponding to the update data to the tag value.

Figure 10:
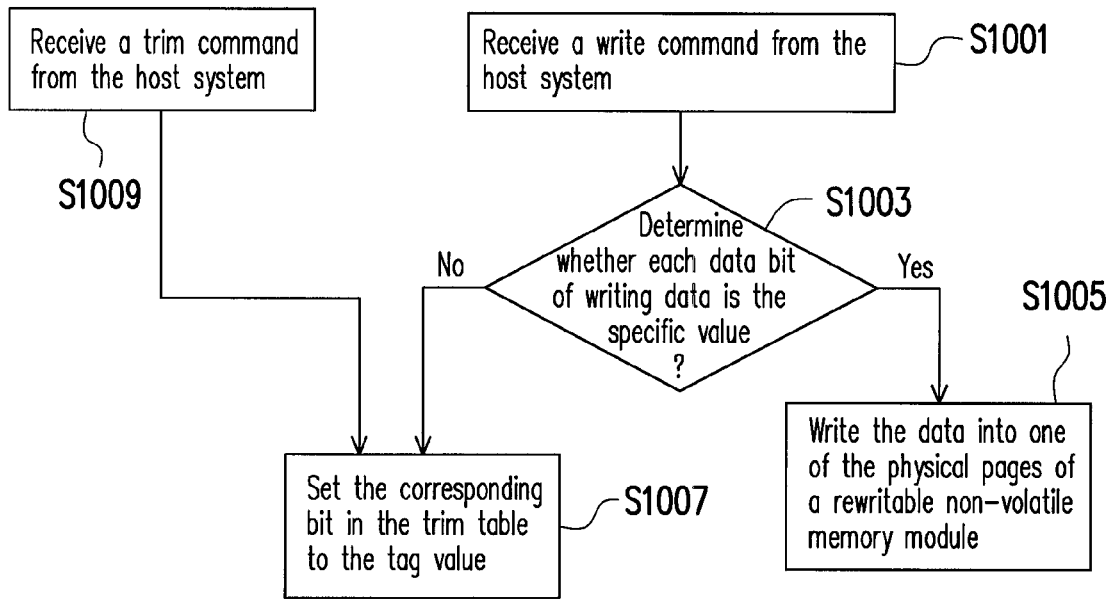
FIG. 10 is a flowchart of a data writing method according to a second exemplary embodiment of the present invention.

FIG. 10 is a flowchart of a data writing method according to the second exemplary embodiment of the present invention.

Referring to FIG. 10, in step S1001, the memory management circuit 202 of the memory controller 104 receives a write command from the host system 1000. In step S1003, the memory management circuit 202 determines whether each data bit of writing data is a specific value.

If any data bit of writing data is not the specific value, in step S1005, the memory management circuit 202 writes the data into one of the physical pages of the rewritable non-volatile memory module 106. The memory management circuit 202 may write data through the regular writing procedure. The regular writing procedure has been described in detail with reference to accompanying drawings therefore will not be described herein.

If each data bit of writing data is the specific value, in step S1007, the memory management circuit 202 sets the corresponding bit in the trim table to the tag value.

In addition, when the memory management circuit 202 of the memory controller 104 receives a trim command from the host system 1000 (S1009), step S1007 is executed.

Figure 11:
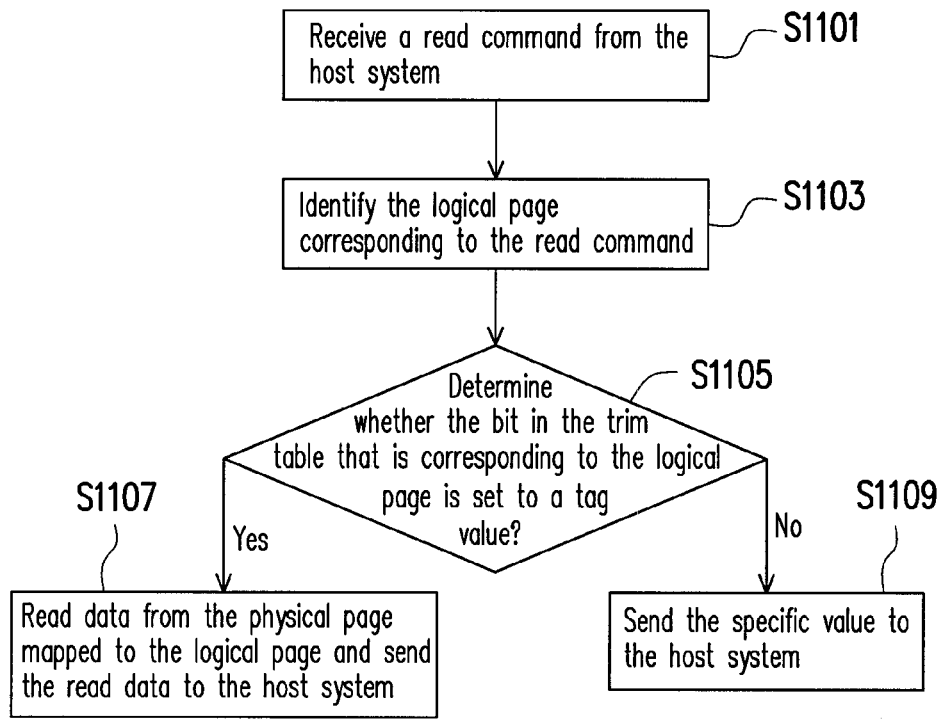
FIG. 11 is a flowchart of a data reading method according to the second exemplary embodiment of the present invention.

FIG. 11 is a flowchart of a data reading method according to the second exemplary embodiment of the present invention.

Referring to FIG. 11, in step S1101, the memory management circuit 202 of the memory controller 104 receives a read command from the host system 1000. In step S1103, the memory management circuit 202 identifies the logical page corresponding to the read command.

Then, in step S1105, the memory management circuit 202 determines whether the bit in the trim table that is corresponding to the logical page is set to a tag value.

If the bit in the trim table that is corresponding to the logical page is not set to the tag value, in step S1107, the memory management circuit 202 reads data from the physical page mapped to the logical page and sends the read data to the host system 1000.

If the bit in the trim table that is corresponding to the logical page is set to the tag value, in step S1109, the memory management circuit 202 sends the specific value to the host system 1000.

In summary, in the data writing method provided by an exemplary embodiment of the present invention, the pattern of data written by a host system is identified, and when the data written by the host system is in a specific pattern, the data is not actually written into the physical pages, so that the time for executing write commands is shortened. In addition, since the data is not actually written into a physical block, when the physical block is used again for writing data, it needs not to be erased. Thereby, the data writing method provided by the present invention reduces the wear of physical blocks and prolongs the lifespan of the memory storage apparatus. The previously described exemplary embodiments of the present invention have the advantages aforementioned, wherein the advantages aforementioned not required in all versions of the present invention.

It will be apparent to those skilled in the art that various modifications and variations can be made to the structure of the present invention without departing from the scope or spirit of the present invention. In view of the foregoing, it is intended that the present invention cover modifications and variations of this present invention provided they fall within the scope of the following claims and their equivalents.

What is claimed is:

1. A data writing method for a rewritable non-volatile memory module, wherein the rewritable non-volatile memory module has a plurality of physical blocks, each of the physical blocks has a plurality of physical pages, a portion of the physical blocks are mapped to a plurality of logical blocks, and each of the logical blocks has a plurality of logical pages, the data writing method comprising:
    configuring a trim table, wherein the trim table has a plurality of bits, and the bits are respectively corresponding to the logical pages;
    receiving data, wherein the data has a plurality of data bits and belongs to one of the logical pages;
    determining whether each of the data bits is a specific value;
    not writing the data into the physical pages and setting one of the bits corresponding to the logical page that the data belongs to as a tag value in the trim table if each of the data bits is the specific value;
    writing the data into one of the physical pages if any one of the data bits is not the specific value; and
    when a trim command is received, setting at least one of the bits corresponding to at least one of the logical pages that is corresponding to the trim command as the tag value in the trim table.

2. The data writing method according to claim 1, wherein the step of determining whether each of the data bits is the specific value comprises:
    loading a flag value from a register circuit; and
    determining whether each of the data bits is the specific value according to the flag value.

3. A memory controller for managing a rewritable non-volatile memory module, wherein the rewritable non-volatile memory module has a plurality of physical blocks, and each of the physical blocks has a plurality of physical pages, the memory controller comprising:
    a host interface, configured to couple to a host system;
    a memory interface, configured to couple to the rewritable non-volatile memory module; and
    a memory management circuit, coupled to the host interface and the memory interface, wherein the memory management circuit is further configured to configure a plurality of logical blocks for mapping to a portion of the physical blocks, and each of the logical blocks has a plurality of logical pages,
    wherein the memory management circuit configures a trim table, wherein the trim table has a plurality of bits, and the bits are respectively corresponding to the logical pages,
    wherein the memory management circuit receives data from the host system, and the data has a plurality of data bits and belongs to one of the logical pages,
    wherein the memory management circuit determines whether each of the data bits is a specific value,
    wherein the memory management circuit does not write the data into the physical pages and sets one of the bits corresponding to the logical page that the data belongs to as a tag value in the trim table if each of the data bits is the specific value,
    wherein the memory management circuit writes the data into one of the physical pages if any one of the data bits is not the specific value,
    wherein when a trim command is received from the host system, the memory management circuit sets at least one of the bits corresponding to at least one of the logical pages that is corresponding to the trim command as the tag value in the trim table.

4. The memory controller according to claim 3 further comprising:
    a register circuit; and
    a comparison circuit, coupled to the register circuit, and configured to determine whether each of the data bits is the specific value and store a flag value into the register circuit when each of the data bits is the specific value,
    wherein the memory management circuit loads the flag value from the register circuit and determines whether each of the data bits is the specific value according to the flag value.

5. A memory storage apparatus, comprising:
    a connector, configured to couple to a host system;
    a rewritable non-volatile memory module, having a plurality of physical blocks, wherein each of the physical blocks has a plurality of physical pages; and
    a memory controller, coupled to the connector and the rewritable non-volatile memory module,
    wherein the memory controller is configured to configure a plurality of logical blocks for mapping to a portion of the physical blocks, and each of the logical blocks has a plurality of logical pages,
    wherein the memory controller configures a trim table, wherein the trim table has a plurality of bits, and the bits are respectively corresponding to the logical pages,
    wherein the memory controller receives data from the host system, and the data has a plurality of data bits and belongs to one of the logical pages,
    wherein the memory controller determines whether each of the data bits is a specific value,
    wherein the memory controller does not write the data into the physical pages and sets one of the bits corresponding to the logical page that the data belongs to as a tag value in the trim table if each of the data bits is the specific value,
    wherein the memory controller writes the data into one of the physical pages if any one of the data bits is not the specific value,
    wherein when a trim command is received from the host system, the memory controller sets at least one of the bits corresponding to at least one of the logical pages that is corresponding to the trim command as the tag value in the trim table.

6. The memory storage apparatus according to claim 5 further comprising:
    a register circuit; and
    a comparison circuit, coupled to the register circuit, and configured to determine whether each of the data bits is the specific value and store a flag value into the register circuit when each of the data bits is the specific value, wherein the memory controller loads the flag value from the register circuit and determines whether each of the data bits is the specific value according to the flag value.

* * * * *